(12) United States Patent
Nagesh et al.

(10) Patent No.: US 10,816,437 B2
(45) Date of Patent: Oct. 27, 2020

(54) CONTACTLESS ROTOR STATE/SPEED MEASUREMENT OF X-RAY TUBE

(71) Applicant: General Electric Company, Schenectady, NY (US)

(72) Inventors: Shivaprasad Nagesh, Karnataka (IN); Ganesh Chandan Gangadharan, Karnataka (IN)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 15/466,362

(22) Filed: Mar. 22, 2017

(65) Prior Publication Data

US 2018/0277330 A1   Sep. 27, 2018

(51) Int. Cl.
 *G01M 13/045* (2019.01)
 *G01P 3/48* (2006.01)
 *H01J 35/10* (2006.01)

(52) U.S. Cl.
 CPC .............. *G01M 13/045* (2013.01); *G01P 3/48* (2013.01); *H01J 35/104* (2019.05); *H01J 2235/1093* (2013.01)

(58) Field of Classification Search
 CPC ....... H01J 35/101; G01M 13/045; G01P 3/48; G01P 3/60; G01P 3/443; G05B 23/0283; F16C 19/52; F16C 19/527
 See application file for complete search history.

(56) References Cited

U.S. PATENT DOCUMENTS

| | | | | |
|---|---|---|---|---|
| 4,433,432 A * | 2/1984 | Nii | ................. | H01J 35/16 378/193 |
| 5,550,890 A * | 8/1996 | Anderson | ............. | F16C 32/044 378/131 |
| 5,809,106 A * | 9/1998 | Kitade | .................. | H01J 35/101 378/117 |
| 5,883,487 A * | 3/1999 | Rosenzweig | ............. | G01P 3/48 318/459 |
| 6,092,029 A * | 7/2000 | Bently | ................ | G01M 13/045 702/190 |
| 7,184,930 B2 * | 2/2007 | Miyasaka | ................ | B61F 15/20 246/169 A |
| 7,308,322 B1 * | 12/2007 | Discenzo | ........... | G05B 23/0221 700/175 |
| 2002/0139191 A1 * | 10/2002 | Hedeen | ............... | G01M 13/045 73/593 |

(Continued)

*Primary Examiner* — David J Makiya
*Assistant Examiner* — Soorena Kefayati
(74) *Attorney, Agent, or Firm* — Boyle Fredrickson, S.C.

(57) ABSTRACT

A contactless and/or non-invasive system and method of determining the rotational state and/or speed of a rotor for an X-ray tube including a liquid metal bearing includes a vibration sensor that is affixed to the exterior of the x-ray tube and is utilized to detect the vibrations generated by the spinning of the rotor and liquid metal bearing assembly within the x-ray tube. The x-ray tube has signature vibration signal based on the construction and rotor speed of the x-ray tube. The system and method of the invention used to detect the rotor state/speed includes a sensor to pick up the vibration from the x-ray tube and perform signal processing, and a software algorithm stored within the device or on an operably connected device or system that can analyze the vibration data from the sensor to indicate whether the anode in the x-ray tube is spinning.

10 Claims, 5 Drawing Sheets

(56) References Cited

U.S. PATENT DOCUMENTS

| | | | |
|---|---|---|---|
| 2006/0167659 A1* | 7/2006 | Miyasaka | G01M 13/045 702/185 |
| 2008/0033695 A1* | 2/2008 | Sahara | G01H 1/003 702/185 |
| 2008/0232950 A1* | 9/2008 | Stabley | F04D 27/001 415/1 |
| 2008/0234964 A1* | 9/2008 | Miyasaka | F16C 19/527 702/113 |
| 2009/0016489 A1* | 1/2009 | Danz | H01J 35/101 378/94 |
| 2009/0140681 A1* | 6/2009 | Hauttmann | H01J 35/101 318/490 |
| 2010/0030492 A1* | 2/2010 | Kar | F16C 19/52 702/39 |
| 2010/0064814 A1* | 3/2010 | Kishino | G01M 13/028 73/660 |
| 2010/0145639 A1* | 6/2010 | Fu | G01H 1/003 702/56 |
| 2011/0295557 A1* | 12/2011 | Hedin | G01M 99/008 702/183 |
| 2012/0035885 A1* | 2/2012 | Tarassenko | G01H 1/006 702/183 |
| 2012/0076277 A1* | 3/2012 | Biehr | H01J 35/101 378/131 |
| 2013/0006551 A1* | 1/2013 | Sako | G01H 1/14 702/56 |
| 2013/0070903 A1* | 3/2013 | Behling | G01M 1/365 378/135 |
| 2013/0142617 A1* | 6/2013 | Rossi | F04D 29/661 415/1 |
| 2014/0167810 A1* | 6/2014 | Neti | G01M 13/045 324/765.01 |
| 2014/0216172 A1* | 8/2014 | Katsaros | G01L 1/255 73/862.59 |
| 2015/0226603 A1* | 8/2015 | Hedin | G01H 1/003 702/39 |
| 2016/0327452 A1* | 11/2016 | Vilar | G01M 13/04 |
| 2017/0108406 A1* | 4/2017 | Thomson | G01H 1/00 |
| 2017/0188443 A1* | 6/2017 | Nakahara | A61B 6/40 |
| 2017/0212008 A1* | 7/2017 | Higashiyama | G01M 13/045 |
| 2017/0281118 A1* | 10/2017 | Hirayu | A61B 6/586 |
| 2017/0301504 A1* | 10/2017 | Burke | H01J 35/101 |
| 2018/0364132 A1* | 12/2018 | Knaup | G01H 1/003 |

* cited by examiner

CONTACTLESS ROTOR STATE/SPEED MEASUREMENT OF X-RAY TUBE

BACKGROUND OF THE INVENTION

The invention relates generally to x-ray tubes, and more particularly to structures and methods of assembly to determine the current operating state and/or rotor speed within an x-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. In many configurations, the anode structure is supported by a liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearings and the material forming the anode structure, i.e., the anode target and the shaft supporting the target.

Advantages of liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys are typically used as the liquid metal in the bearing structure, as they tend to be liquid at room temperature and have adequately low vapor pressure, at operating temperatures, to meet the rigorous high vacuum requirements of an x-ray tube. Liquid metal bearing tubes are noiseless and have longer life than prior art bearings which increases the useful life of the machines in which they are utilized.

To know the state of the x-tube rotor is very important in order to start the exposure obtained by the x-ray tube and associated imaging device. With regard to prior art x-ray tubes employing ball bearings, the controls for the x-ray tube were open loop as the probability of the rotor getting stuck was very low due to the construction of the ball bearing assembly. Thus, there were no need for any feedback mechanism to detect the operational state and/or speed of the rotor.

In newer x-ray tubes employing liquid metal bearings, one significant short coming of the liquid metal bearing tube compared to prior art bearing tubes is that a liquid metal bearing tube needs higher torque applied to the rotating portions of the liquid metal bearing to start the bearing tube spinning from a full stop. In particular, the starting torque needed to initially spin the bearing, and thus the target or anode prior to shooting x-rays at the target, is very high in order to overcome the friction between present within the components of the liquid metal bearing assembly.

Further, the initial torque required to start the liquid metal bearing spinning varies with respect to temperature. At lower ambient temperatures the chances of anode rotation not starting upon initial application of torque to the liquid metal bearing are very high as there is the potential for the liquid metal at least partially solidify at those lower temperatures.

However, with a typical low cost liquid metal bearing x-ray tube there is not a sufficient back electromotive force (EMF) form the current supplied to bearing assembly that can be measured to indicate the current state and/or speed or rotation of the liquid metal bearing assembly due to inherent construction of the grounded stator in the x-ray tube.

As a result, it is difficult to determine the anode/liquid metal bearing rotation state, i.e., whether that anode has started to spin or not. This determination is critical before starting the x-ray imaging process as directing an x-ray onto a non-rotating anode overheats and damages the anode/target inside the tube rending the x-ray tube useless. However, various prior art techniques for determining the rotational state and/or speed of the liquid metal bearing to avoid damage to the tubes and associated unwanted downtime require invasive measurements, including back EMF, tachometer, etc., and require special design and construction of the associated x-ray tube, such that the imaging system must be specially designed to accommodate for the altered tube design. As such, these specialized bearing designs cannot be applied or used on any available X-ray tube.

As a result, there is a need for the development of a structure and method for determining the rotational state and/or speed of a liquid metal bearing and associated anode in an x-ray tube in a non-invasive manner. It is further desirable that the structure and method be able to be applied to existing and new x-ray tubes without modifying the structure of the x-ray tubes.

BRIEF DESCRIPTION OF THE INVENTION

According to one aspect of an exemplary embodiment of the invention, a non-invasive system and method of determining the rotational speed and/or state of a rotor is provided for an X-ray tube including a liquid metal bearing. The system includes a vibration sensor that is affixed to the exterior of the x-ray tube and is utilized to detect the vibrations generated by the spinning of the rotor and liquid metal bearing assembly within the x-ray tube. The x-ray tube has signature vibration signal based on the construction and rotor speed of the x-ray tube. The system and method of the invention used to detect the rotor state/speed includes a device that has a sensor to pick up the vibration signature from the x-ray tube and can perform signal processing, and a software algorithm stored within the device or on an operably connected device or system that can analyze the vibration data from the sensor to indicate whether the anode in the x-ray tube is spinning. These vibrations from the sensor are employed within the suitable algorithm to determine whether the rotor and anode is stationary, is spinning or was spinning but has stalled. The structure and method of the system effectively detects the state of the rotating anode on any x-ray tube without requiring any alteration of the structure of the x-ray tube in order prevent an x-ray from being directed onto on a stalled anode, thereby preventing damage to the anode and x-ray tube.

In one exemplary embodiment of the invention, the invention is a vibration detection device adapted to be secured to an x-ray tube for non-invasively determining the operational state of a bearing assembly and anode within the tube including a securing mechanism capable of securing the device to an exterior of a frame of the x-ray tube, an accelerometer adapted to receive vibration data from the x-ray tube frame generated by the bearing assembly and anode, a digital signal processor operably connected to the accelerometer and including a signal processing algorithm capable of converting vibration data from the accelerometer to frequency data; and an electronic storage medium operably connected to the digital signal processor.

In another exemplary embodiment of the invention, the invention is an x-ray tube including a frame, a rotating bearing assembly disposed within the frame, an anode secured to the bearing assembly to rotate therewith and a vibration detection device secured to an exterior of the frame, the vibration detection device operable to detect the operational condition of the bearing assembly.

In still another exemplary embodiment of a method of the invention, a method for non-invasively determining the operating condition of an x-ray tube bearing assembly includes the steps of securing a vibration detection device to an exterior of a frame of an x-ray tube, determining a base peak frequency of the x-ray tube beating assembly with the vibration detection device, determining a number of analysis peak frequencies over an analysis time period with the vibration detection device, and comparing the number of analysis peak frequencies to the base peak frequency to determine if more than half of the analysis peak frequencies are different than the base peak frequency, wherein the bearing assembly is spinning if more than half of the analysis peak frequencies are different than the base peak frequency and wherein the bearing assembly is stalled if less than half of the analysis peak frequencies are the same as the base peak frequency.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE INVENTION

Figure 1:
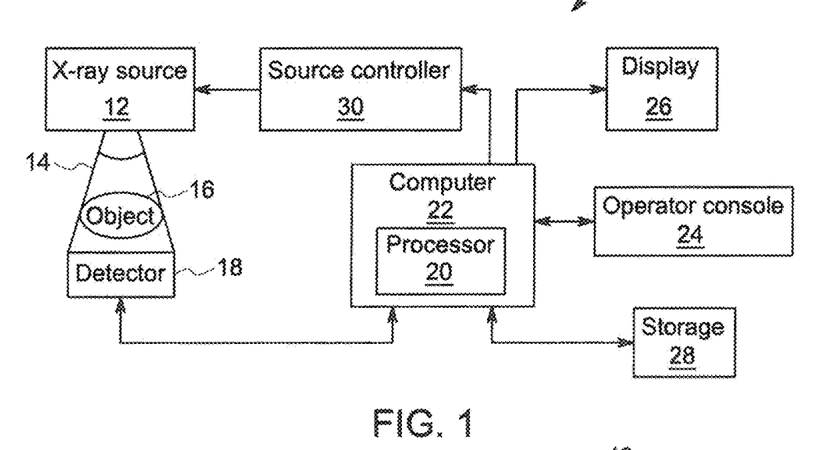
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 4:
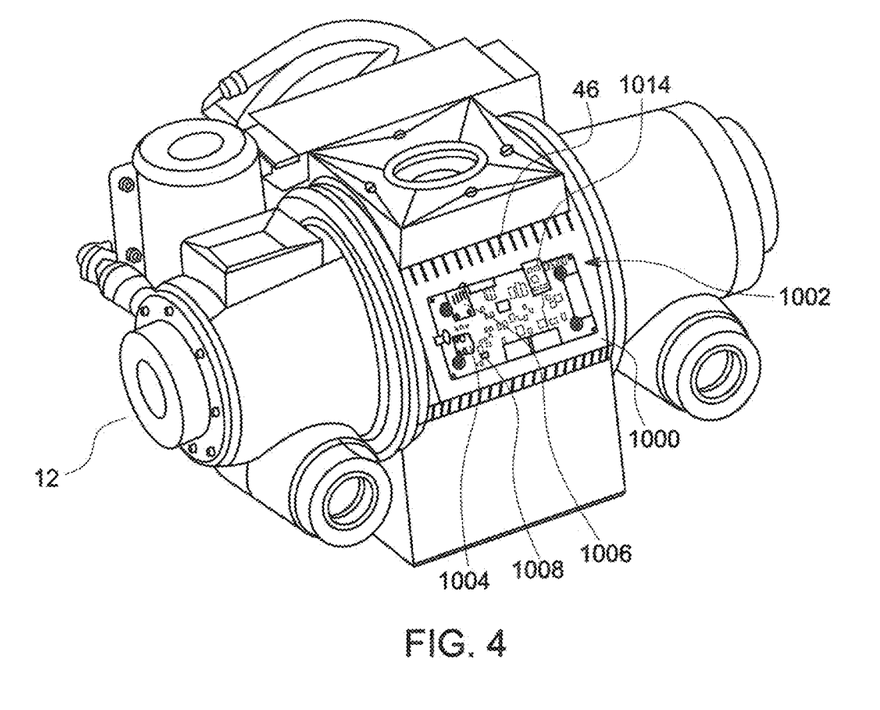
FIG. 4 is a schematic view of the system attached to an x-ray tube in accordance with an exemplary embodiment of the invention.

FIG. 4 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within an envelope or frame 46, which houses a target or anode 48, a bearing assembly 50, and a cathode 52. Frame 46 defines an area of relatively low pressure (e.g., a vacuum) 30 compared to ambient, in which high voltages may be present. Frame 46 may be positioned within a casing (not shown) filled with a cooling medium, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads 56. The electrical signals may be timing/control signals that cause cathode 52 to emit electron beam 54 at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a thermionic filament within cathode cup 62 to form electron beam 54.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in frame 46 toward a detector array, such as detector 18 of FIG. 1.

Anode assembly 42 includes a rotor 72 and a stator (not shown) located outside x-ray source 40 and partially surrounding rotor 72 for causing rotation of anode 48 during operation. Target 48 is supported in rotation by a bearing assembly 50, which, when rotated, also causes target 48 to rotate about the centerline 70. As shown, target 48 has a generally annular shape, such as a disk, and cylindrical channel 74 extending axially and outwardly away from the center thereof for receiving bearing assembly 50 therein.

Target 48 may be manufactured to include a number of metals or composites, such as tungsten, molybdenum, copper, or any material that contributes to Bremsstrahlung (i.e., deceleration radiation) when bombarded with electrodes. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46. In a CT application, the x-ray source 40 as a whole is caused to rotate about an object, such as object 6 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting bearing having adequate load-hearing capability and acceptable acoustic noise levels for operation within imaging system 10 of FIG. 1. As used herein, the terms "self-acting" and "self-lubricating" mean that the bearing lubricant remains distributed on the surfaces of the bearing due to the relative motion of the bearing components and absent an external pump.

In general, bearing assembly 50 includes a stationary portion, such as center shaft 76, and a rotating portion, such as shell 78 to which the target 48 is attached. While center shaft 76 is described with respect to FIG. 2 as the stationary portion of bearing assembly 50 and shell 78 is described as the rotating portion of bearing assembly 50, embodiments of the present invention are also applicable to embodiments wherein center shaft 76 is a rotary shaft and shell 78 is a stationary component. In such a configuration, target 48 would rotate as center shaft 76 rotates.

Center shaft 76 may optionally include a cavity or coolant flow path 80 though which a coolant (not shown), such as oil, may flow to cool bearing assembly 50. As such, coolant enables heat generated from target 48 of x-ray source 40 (FIG. 2) to be extracted therefrom and transferred external to x-ray source 40. In straddle mounted x-ray tube configurations, coolant flow path 80 extends along a longitudinal length of x-ray source 40. In alternative embodiments, coolant flow path 80 may extend through only a portion of x-ray source 40, such as in configurations where x-ray source 40 is cantilevered when placed in an imaging system.

Figure 2:
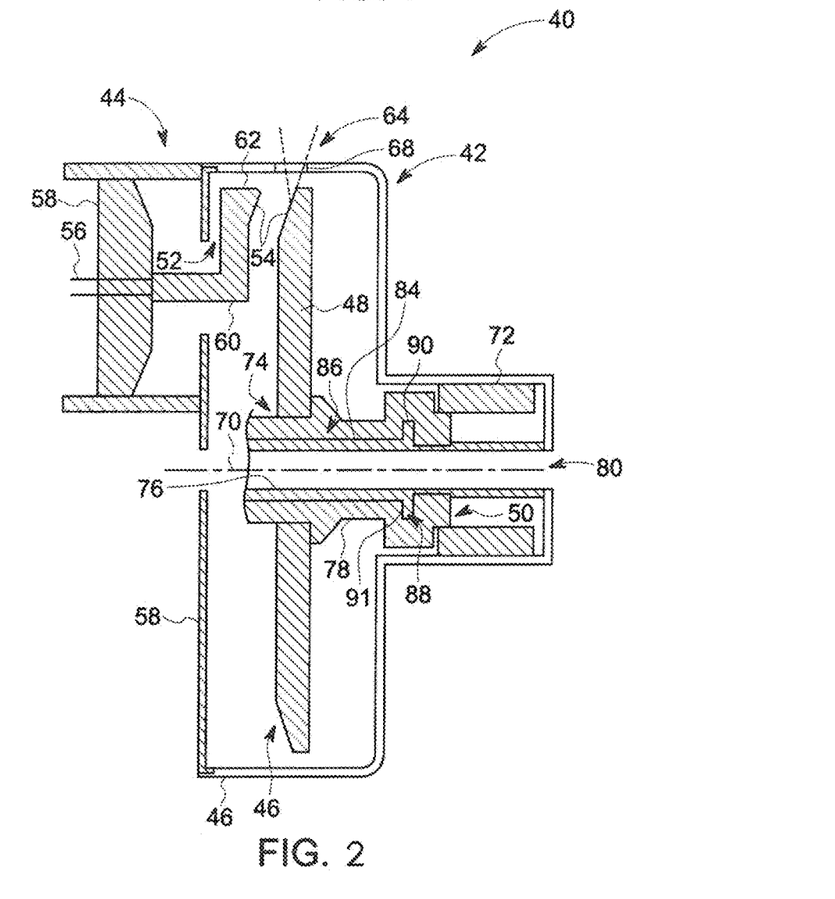
FIG. 2 is a cross-sectional view of a portion of an x-ray tube according to an exemplary embodiment of the invention and usable with the system illustrated in FIG. 1.

In FIG. 2, a cross-sectional view of a portion of bearing assembly or structure 50 is shown according to an embodiment of the invention. Bearing assembly 50 includes a center shaft 76 positioned within shell 78, which is configured to support an anode 82 such as target 48. A lubricant 84 is positioned in a gap 86 formed between center shaft 76 and shell 78. In embodiments of the invention, lubricant 84 is a metal or metallic alloy that exists in a liquid or fluid state at operating temperature of bearing assembly 50.

The lubricating fluid 84 flowing between the rotating and stationary components of the bearing assembly or structure 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 2, center shaft 76 of bearing assembly 50 is a stationary component and shell 78 is a rotatable component constructed to rotate about center shaft 76 in order to rotate the target 48/anode 82, which spaced from an insulator 85 and defines a high voltage space 87 therebetween. However, one skilled in the art will recognize the inventive concepts described herein are applicable to alternative bearing configurations. As one example, bearing assembly 50 may instead include a stationary outer component and a rotating center shaft having a target attached thereto. As another example, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, this invention is applicable to any bearing configuration having a rotatable component and a stationary component, and a liquid lubricant therebetween, regardless of configuration or application.

As illustrated in FIGS. 1-2, center shaft 76 of bearing assembly 50 includes a thrust bearing portion 88 comprising a radial projection 90 that extends from center shaft 76 and is positioned in a radial cavity 91 of shell 78. Various coatings, textures, and patterns including grooves embedded in the contacting surfaces of bearing assembly 50 may be applied to alter bearing behavior as the shaft 76 and shell 78 rotate relative to each other.

Bearing assembly or structure 50 may be referred to as a spiral groove bearing (SGB) due to the patterning of grooves along the various surfaces of the bearing. In some examples, the spiral groove may be formed from a logarithmic spiral shape. The spiral groove bearing may also be equivalently referred to as a fluid dynamic bearing and liquid metal bearing (LMB) as well.

In the bearing assembly 50, compression seals 92 employing capillary forces are utilized to restrict the flow of the lubricant 84, wherein the small gap between two opposing bearing surfaces forming the compression seal 92 wets the fluid to retain the fluid within the gap 86. In other words, the anti-wetting properties of the surface (via texturing, coating, or both) aids in preventing the lubricant 84 from flowing in between the small gaps within the seals 92. In some examples, the surfaces are coated and/or textured to be more wetted such that the lubricant 84 clings in the small gap to reduce lubricant moving through the gap. In other examples, the surfaces are coated and/or textured to be more anti-wetting such that the lubricant is pushed away from the small gaps near the ends of the bearing assembly. In this context, the small gap in the compression seal 92 may be on the order of 0 to 10 μm.

Figure 3:
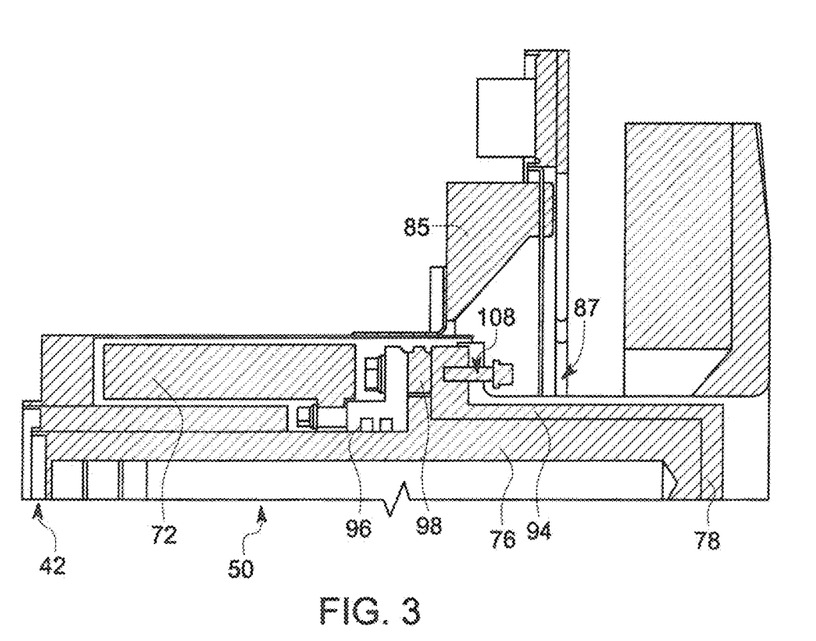
FIG. 3 is a cross-sectional view of an anode assembly of an x-ray tube in accordance with an exemplary embodiment of the invention.

Operation of liquid bearings in x-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves. For example, given a substantially constant rotational speed of the liquid bearing, deeper grooves may provide a higher pumping force, while the increased clearance between the shaft and sleeve can reduce the load carrying ability of the bearing. Pumping force may be utilized to contain the lubrication fluid and anti-wetting coatings may be applied to sealing surfaces to further assist in containing the lubrication fluid.

The lubricating fluid in between bearing surfaces such as the shaft 76 and sleeve 78 are rotating relative to each other. As such, the lubricating fluid 84 is moved in a number of ways, including but not limited to, shearing, wedging, and squeezing, thereby creating pressures to lift and separate the shaft and sleeve from each other. This effect enables the liquid bearing to function and provide lose-friction movement between the shaft and sleeve. In other words, shearing of the lubricating fluid imparts energy into the fluid which cases the fluid to pump, wherein the pumping action into the gap between the shaft and sleeve is how the liquid bearing functions. Energy transfer from the surfaces to the fluid enables bearing functionality. In application, in the context of the x-ray tube, wetting between some bearing surfaces and the lubricating fluid allows shearing to impact energy to the fluid.

In the exemplary embodiment of the invention illustrated in FIG. 3 the shell or sleeve 78 is formed with a 3-piece construction including a journal bearing 94, a thrust bearing 96 and a spacer 98 located between the journal bearing 94 and the thrust bearing 96 that combine to form the radial cavity 91 that receives the thrust beating portion 88 of shaft 76. The surfaces of the journal bearing 94 and the thrust bearing 96 that contact the spacer 98 to form the compression seals 92. The journal bearing 94 and the thrust bearing 96 are engaged with one another and with the spacer 98 through the use of bolts 100 inserted through and engaged within aligned apertures in the journal bearing 94, thrust bearing 96 and spacer 98, respectively.

Figure 5:
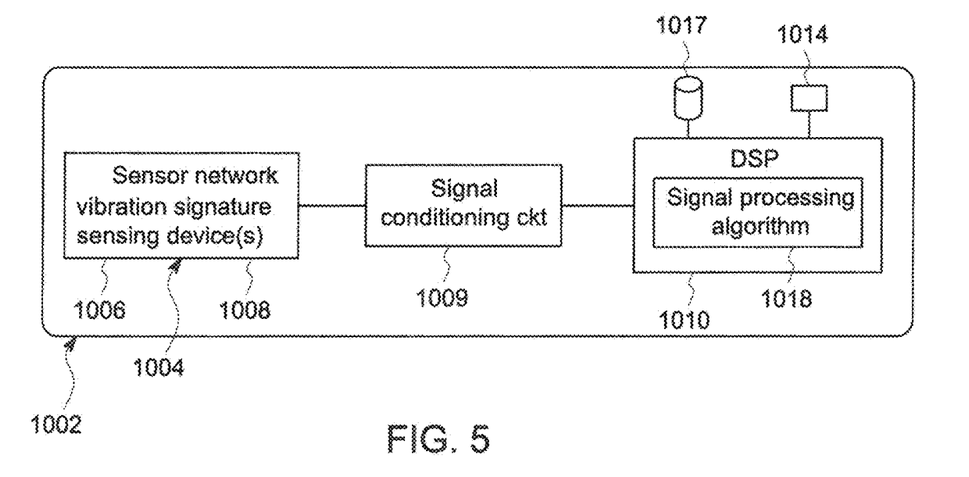
FIG. 5 is a schematic view of the system in accordance with an exemplary embodiment of the invention.

Referring now to FIGS. 4 and 5, the imaging system 10 includes a rotation detection system 1000 secured in part to the frame 46 of the x-ray tube 12. The system 1000 includes one or more vibration detection devices 1002, such as one or more sensors 1004, that are secured to the frame 46. The device 1002 is secured to the imaging system 10 in order that the vibration generated by and/or coming from the bearing assembly 50 and anode 82 have the maximum signal amplitude sensed by the device 1002 compared to any other sources of vibration from the imaging system 10 that can be sensed by the device 1002. In the illustrated exemplary embodiment, the device(s) 1002 is positioned on the frame 46 for the tube 12 where the vibration signal amplitude due to the vibrations generated by rotation of the anode 82 is relatively high compared to other sources of vibration, such as at least 20% greater than any other vibration source.

In the exemplary embodiment of FIG. 4, the vibration detection device 1002 includes as sensors 1004 an analog accelerometer 1006 and a digital accelerometer 1008 that each that can sense vibrations in the frame 46 generated by the rotation of the liquid metal bearing assembly 50 and the anode 82 within the x-ray tube 12. The device 1002 additionally includes a signal processing circuit 1010 that conditions the vibration signals obtained from the analog accelerometer 1006 and/or the digital accelerometer 1008 for transmission to a programmable digital signal processing (DSP) unit 1010 operably connected to the device 1002. In the exemplary illustrated embodiment, the DSP 1010 is mounted directly onto the vibration detection device 1002 in order to perform the processing of the vibration signals thereon. The device 1002 additionally includes a WiFi transmitter 1014 that is capable of wirelessly transmitting the processed vibration signals) and results to a separate computer 1012 or similar device, such as via a computing cloud network 1016, for review and further analysis. Alternatively, the device 1002 can utilize the WiFi transmitter 1014 to wirelessly transmit the conditioned vibration signals to a DSP 1010, computer or system 1012 separate from the device 1002.

In the illustrated exemplary embodiment, the DSP or processing unit 1010 includes a suitable electronic storage medium 1017 in which the vibration signal(s) are stored. The processing unit 1010 additionally includes a signal processing algorithm 1018 stored within the unit 1010 that can be accessed by the unit 1010 and utilized to analyze the signals obtained by the accelerometers 1004 on the vibration detection device 1002. The processing unit 1010 performs a time domain to frequency domain conversion on the vibration signals using the algorithm 1018, such as Fast Fourier Transform algorithm, in order to determine convert the vibration data from the sensors/accelerometers 1004 into frequency data for use in a separate algorithm 1019 (FIG. 6) to determine the operational state and/or speed of the bearing assembly 50 and anode 82.

Figure 6:
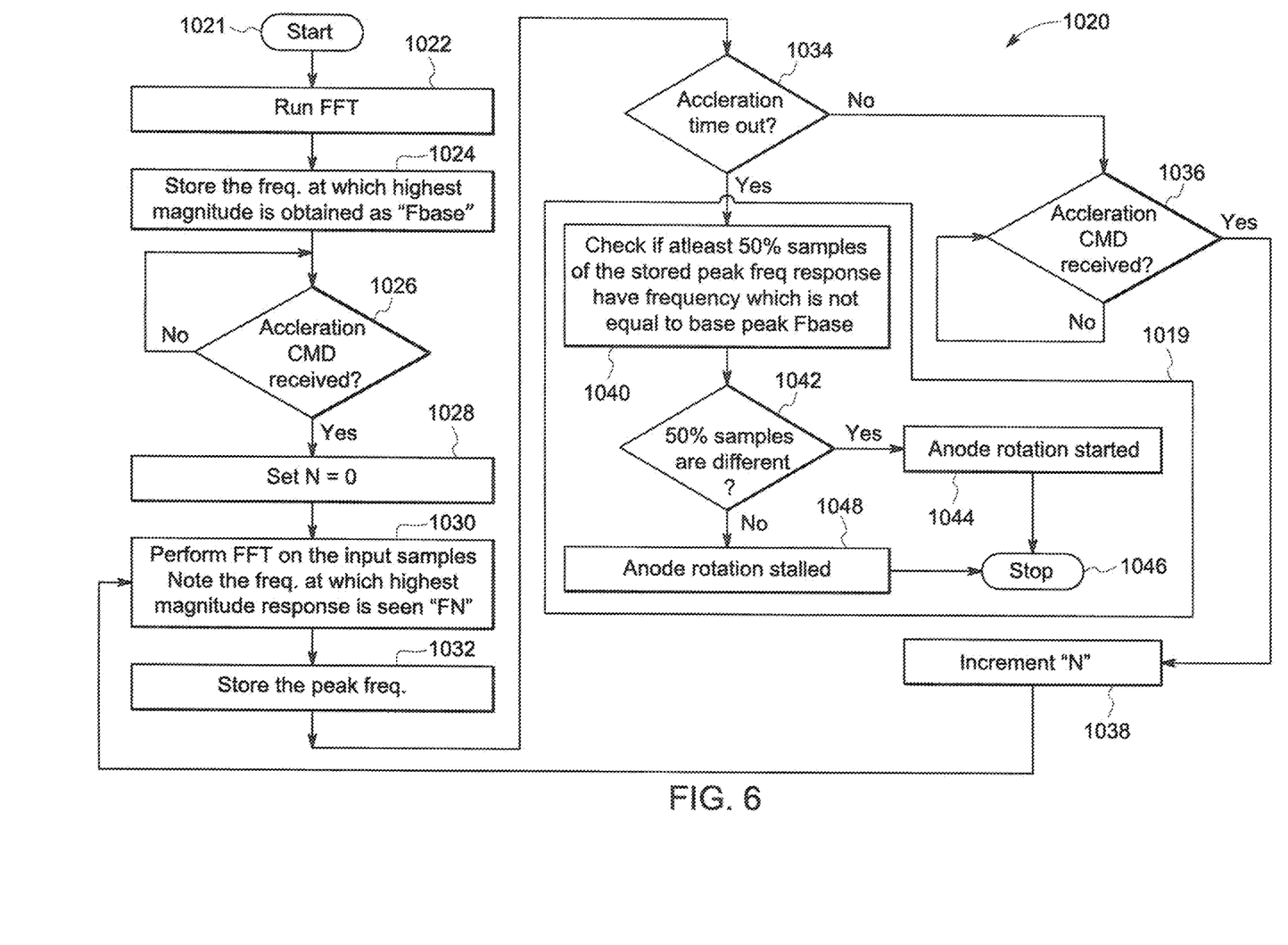
FIG. 6 is a flowchart illustrating the method of operation of the system according to an exemplary embodiment of the invention.

Referring now to FIG. 6, in the method 1020 for operation of the system 1000 and device 1002, when the device 1002 is powered on in block 1020, initially during a baseline time period the DSP 1010 will obtain vibration data from the accelerometers 1004 and perform a frequency analysis on these data using the algorithm 1018 in in block 1022. In block 1024, the DSP 1010 will store the frequency at which the highest magnitude response is obtained and identified as the base peak frequency $F_{base}$. In block 1026, the device 1002 will determine if the x-ray source 12 has received an initiated a command to accelerate the bearing assembly 50/anode 82. If no command has been received, the device 1002 returns to block 1026 to await that command. However, if an accelerate command has been received, the device 1002 proceeds to block 1028 where the device 1002 sets the analysis iteration value to N=0. In block 1030 the device 1002 then begins to obtain vibration data from the x-ray tube 12 using the accelerometers 1004. In doing so, the device 1002 uses the data acquisition with the stored algorithm 1018 to analyze fore the frequency component of the data that has the highest magnitude periodically over the stipulated time 1033 for acceleration to occur, which is designated the analysis peak frequency $F_N$. This frequency $F_N$ for the specified analysis time period 1035 is stored within the device 1002, or transmitted from the device 1002 for storage in a separate computer or system 1012, in block 1032. In block 1034, the device 1002 then determines if the overall time period 1033 for the acceleration of the bearing assembly 50/anode 82 has expired, or if there is a portion of the time period 1033 remaining.

If time remains in the acceleration period 1033, the device 1002, in block 1036 the device 1002 determines if the vibration/frequency analysis time period 1035 has expired and a new analysis time period 1035 is ready begin. If not, the device 1002 awaits the expiration of the present analysis period 1035. If so, the device increments the designation for the analysis time period 1035 to N+1 in block 1038 and subsequently returns to block 1030 to initiate obtaining vibration data from the accelerometers 1004 for analysis of the frequency component data for the next analysis time period 1035.

In block 1034, if the entire acceleration time period 1033 has elapsed, the device 1002/DSP 1010/computer 1012 moves to block 1040 where each of the stored analysis peak frequencies $F_0$-$F_N$ for the various analysis time periods 1035 from analysis period 0 to analysis period N are compared with the frequency peak $F_{base}$ by the algorithm 1019 in order to determine if the bearing assembly 50/anode 82 is spinning and/or has been accelerated during the acceleration time period 1033. In one exemplary embodiment, in order to determine this the stored peak frequencies $F_0$-$F_N$ are compared with the base frequency peak $F_{base}$ to determine if at least 50% of the stored peak frequencies $F_0$-$F_N$ are not equal to the frequency peak $F_{base}$. In block 1042, if the device 1002 determines that at least 50% of the stored analysis peak frequencies $F_0$-$F_N$ are different (greater or less than) than the base frequency peak $F_{base}$, i.e., show magnitude variation with respect to $F_{base}$, the device 1002 determines in block 1044 that the bearing assembly 50/anode 82 is spinning and proceeds to block 1046 to stop the analysis, until a subsequent analysis is initiated. Conversely, if less than 50% of the stored peak frequencies $F_0$-$F_N$ are different (greater or less than) than the frequency peak $F_{base}$, the device 1002 determines in block 1048 that the bearing assembly 50/anode 82 is spinning and/or has stalled and proceeds to block 1046 to stop the analysis, and optionally to warn an individual utilizing the system 10 and/or stop/prevent use of the imaging system 10 to prevent damage being done to the anode 82.

Further, once an acceleration time period 1035 has expired and the algorithm 1019 has completed the analysis at block 1046 of the method 1020 to determine the present state of the bearing assembly 50/anode 48, the method 1020 can return to block 1021 in order to obtain a new $F_{base}$ for the x-ray tube 12 that represents a new operational base condition for the x-ray tube 12 during a baseline time period, such as when the x-ray tube 12 is undergoing an incremental start-up process to reach an operational rotation speed for the bearing assembly 50/anode 82 within the x-ray tube 12. The new $F_{base}$ can then be used in a subsequent iteration of the method to determine if a subsequent acceleration of the bearing assembly 50/anode 82 has occurred relative to the new $F_{base}$.

Figure 7:
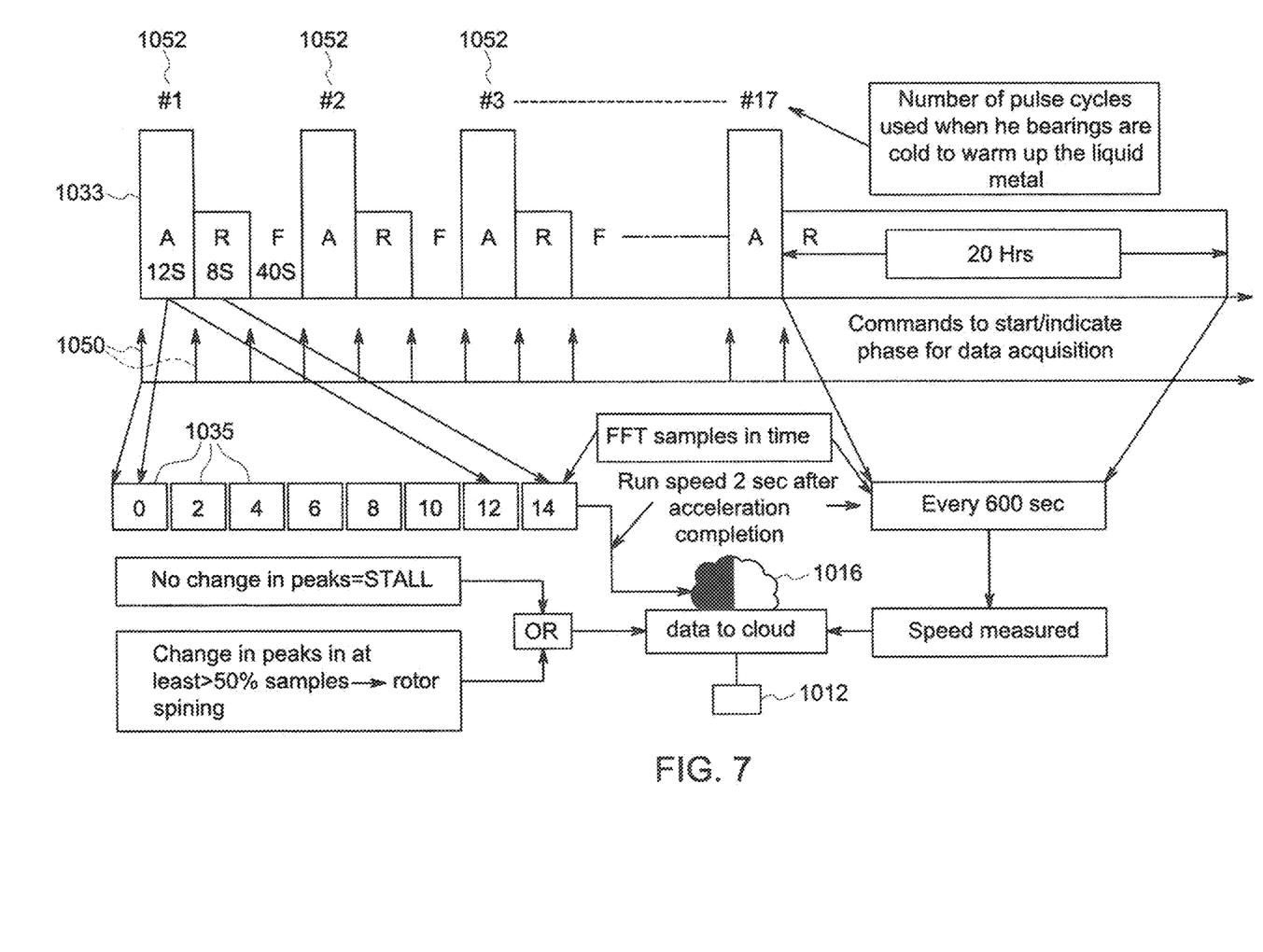
FIG. 7 is a schematic view of an acceleration data acquisition for an x-ray tube using the system according to an exemplary embodiment of the invention.

In one illustrated exemplary embodiment of this analysis, referring to FIG. 7, over the course of the acceleration period 1033/A for the x-ray tube 12, current is applied to the rotor 72 in order generate an electric field that interacts with the stator (not shown) in order to cause the rotor 72, and the attached bearing assembly 50 and anode 82 to rotate within the frame 46. After the acceleration period 1033/A, the rotor 72 is maintained or run at the desired speed resulting from the acceleration in period 1033/A for a run phase or time period R using a suitable applied current, and subsequently allowed to free run without any current applied to the rotor 72 during a free run phase or time period F. Each of the acceleration phase or time period 1033/A, run phase or period R and free run phase or period F are initiated by commands 1050 issued by a controller (not shown). In the illustrated exemplary embodiment of FIG. 7, these three phases or time periods 1033/A, R and F constituting the pulse cycle 1052 each last approximately twelve (12) seconds, eight (8) seconds and forty (40) seconds, respectively, and are repeated a number of times, e.g., seventeen (17) pulse cycles 1052, in order to adequately warm up the bearing fluid 84 within the hearing assembly 50 from a cold start and/or cold ambient temperatures prior to use of the imaging system 10/x-ray tube 12.

In the exemplary analysis illustrated in FIG. 7, as the duration of the acceleration time period 1033/A is twelve (12) seconds, a vibration/frequency analysis time period 1035 is selected to be two (2) seconds to provide seven (7) analysis peak frequency output points $F_0$-$F_6$ a for analysis/comparison with $F_{base}$. Obtaining each of the output points $F_0$-$F_6$ corresponds to blocks 1028-1038 of the illustrated exemplary embodiment of the method 1020 in FIG. 6. After the output points $F_0$-$F_6$ are obtained, each of the output points $F_0$-$F_6$ is then compared with the frequency peak $F_{base}$ using the algorithm 1019 that has an exemplary embodiment illustrated in blocks 1040-1048 of the method 1020 of FIG. 6 determine if at least 50% of the output points $F_0$-$F_6$ are different than frequency peak $F_{base}$. This analysis is completed for each pulse cycle 1052 in order to determine if the hearing assembly 50/anode 82 has stalled at any of the pulse cycles 1052 prior to reaching the desired operating speed for the final run phase R, which can last for 20 hours, during which the speed of the bearing assembly 50/anode 82 is analyzed periodically. Further, the speed of the bearing assembly 50/anode 82 is determined at the beginning of each run phase or period R, and this data is sent along with the data concerning the peak frequency output points $F_0$-$F_0$ to the computer 1012 or cloud 1016 for storage and/or further analysis.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for non-invasively determining the operating condition of an x-ray tube bearing assembly, the method comprising the steps of:
   securing a vibration detection device to an exterior of a frame of an x-ray tube;
   determining a base peak frequency of the x-ray tube bearing assembly with the vibration detection device;
   determining a number of analysis peak frequencies over an analysis time period with the vibration detection device; and
   comparing the number of analysis peak frequencies to the base peak frequency to determine if more than half of the analysis peak frequencies are different than the base peak frequency or if less than half of the analysis peak frequencies are different than the base peak frequency, wherein the bearing assembly is spinning if more than half of the analysis peak frequencies are different than the base peak frequency and wherein the bearing assembly is stalled if less than half of the analysis peak frequencies are less than the base peak frequency.

2. The method of claim 1 wherein the step of determining the number of analysis peak frequencies comprises determining the analysis peak frequencies during an acceleration phase for the x-ray tube.

3. The method of claim 1 wherein the step of obtaining the base peak frequency comprises the steps of:
   obtaining vibration data for the bearing assembly during a baseline time period with the vibration detection device;
   converting the vibration data to frequency data for the baseline time period; and
   determining a peak value for the base frequency data of the baseline time period.

4. The method of claim 1 further comprising the step of wirelessly transmitting the result from the vibration detection device to a separate computing device.

5. The method of claim 2 wherein the step of determining the number of analysis peak frequencies comprises:
   determining the length of the acceleration phase;
   dividing the acceleration phase into a number of analysis time periods; and
   determining an analysis peak frequency for each analysis time period within the acceleration phase.

6. The method of claim 5 wherein the step of obtaining the analysis peak frequency for each analysis time period comprises the steps of:
   obtaining vibration data for the bearing assembly during the analysis time period with the vibration detection device;
   converting the vibration data to frequency data for the analysis time period; and
   determining a peak value for the frequency data of the analysis time period.

7. The method of claim 4 wherein the step of wirelessly transmitting the result to a separate computing device comprises wirelessly transmitting the result to a cloud network.

8. A vibration detection device adapted to be secured to an x-ray tube for non-invasively determining the operational state of a bearing assembly and anode within the tube, the device comprising:
   a securing mechanism capable of securing the device to an exterior of a frame of the x-ray tube;
   an accelerometer adapted to receive vibration data from the x-ray tube frame generated by the bearing assembly and anode;
   a digital signal processor operably connected to the accelerometer and including a signal processing algorithm capable of converting vibration data from the accelerometer to frequency data and analyzing the frequency data by comparing a number of analysis peak frequencies to a base peak frequency to determine if more than half of the analysis peak frequencies are different than the base peak frequency or if less than half of the analysis peak frequencies are different than the base peak frequency, wherein the bearing assembly is spinning if more than half of the analysis peak frequencies are different than the base peak frequency and wherein the bearing assembly is stalled if less than half of the analysis peak frequencies are different less than the base peak frequency; and
   an electronic storage medium operably connected to the digital signal processor.

9. The device of claim 8 further comprising a wireless transmitter operably connected to the digital signal processor.

10. An x-ray tube comprising:
    a frame;
    a rotating bearing assembly disposed within the frame;
    an anode secured to the bearing assembly to rotate therewith; and
    a vibration detection device secured to an exterior of the frame, the vibration detection device including a digital signal processor having a signal processing algorithm capable of converting vibration data to frequency data and analyzing the frequency data, and operable to detect the operational condition of the bearing assembly by comparing a number of analysis peak frequencies to a base peak frequency to determine if more than half of the analysis peak frequencies are different than the base peak frequency or if less than half of the analysis peak frequencies are different than the base peak frequency, wherein the bearing assembly is spinning if more than half of the analysis peak frequencies are greater than the base peak frequency and wherein the bearing assembly is stalled if less than half of the analysis peak frequencies are greater than the base peak frequency.

* * * * *

UNITED STATES PATENT AND TRADEMARK OFFICE
CERTIFICATE OF CORRECTION

PATENT NO. : 10,816,437 B2
APPLICATION NO. : 15/466362
DATED : October 27, 2020
INVENTOR(S) : Shivaprasad Nagesh et al.

Page 1 of 1

It is certified that error appears in the above-identified patent and that said Letters Patent is hereby corrected as shown below:

In the Claims

Claim 8, Column 12, Line 30, delete "different".

Signed and Sealed this
Twenty-second Day of December, 2020

Andrei Iancu
*Director of the United States Patent and Trademark Office*